Oct. 3, 1961  B. C. HARRIS  3,002,766
FIFTH WHEEL CONSTRUCTION
Filed April 20, 1959  2 Sheets-Sheet 1

INVENTOR.
BERT C. HARRIS
BY
WATTS & EDGERTON
A H Edgerton,
ATTORNEYS

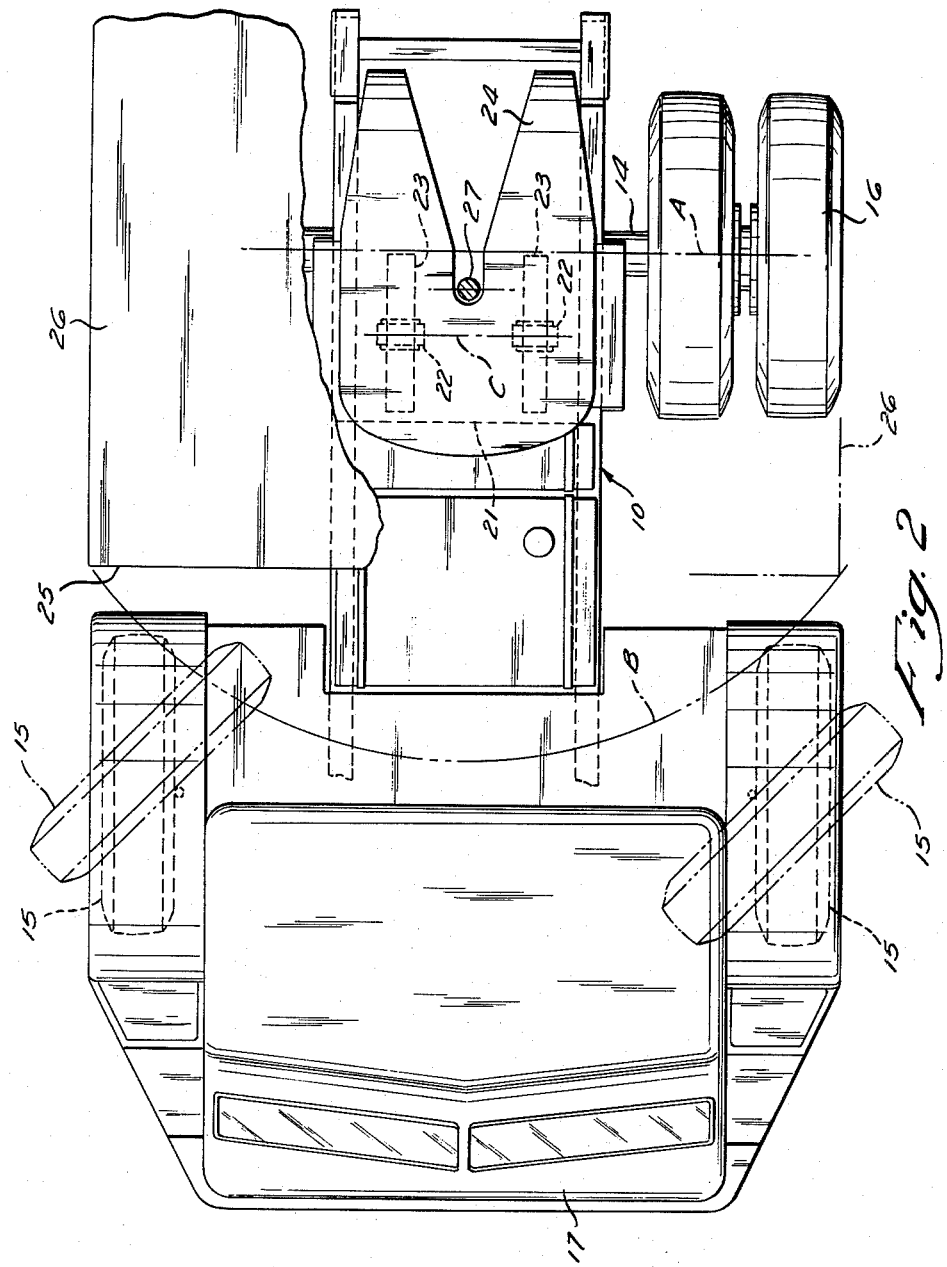

United States Patent Office 3,002,766
Patented Oct. 3, 1961

3,002,766
FIFTH WHEEL CONSTRUCTION
Bert C. Harris, Chagrin Falls, Ohio, assignor to The White Motor Company, Cleveland, Ohio, a corporation of Ohio
Filed Apr. 20, 1959, Ser. No. 807,693
5 Claims. (Cl. 280—423)

This invention relates broadly to motor vehicles and more specifically to the arrangement of the king pin relative to the pivotal connection for the fifth wheel in a tractor trailer combination.

The primary object of the invention is to mount the king pin rearward the pivotal axes for the vertical movement of the fifth wheel and also forward a vertical plane including the axis of the foremost of the rear wheels in order to impose a portion of the load of the trailer upon the front wheels of the tractor and thus avoid the upward deflection thereof and the consequent interference of the trailer body with the tractor cab during the application of severe torque in sharp turns.

Heretofore it has been the practice to mount the king pin in a vertical plane normal to the center of the axes of the pivot for the vertical movement of the fifth wheel. When the wheel base of the tractor is relatively short and the load of the trailer is imposed on the rear wheels of the tractor, such structure effects sufficient elevation of the forward end of the tractor to cause the forward corner of the trailer to strike the rearward edge of the cab as the tractor negotiates sharp turns. By advancing the king pin and the fifth wheel pivot, this difficulty is eliminated since a portion of the weight of the tractor carried by the front wheels of the tractor and the tendency to elevate the front wheels is eliminated during sharp angle turns.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

FIG. 2 is a plan view of the tractor and trailer, illustrating in dotted lines, the position of the tractor wheels when actuated, and the location of the king pin relative to the pivotal connection for the vertical movement of the trailer.

Figure 1:
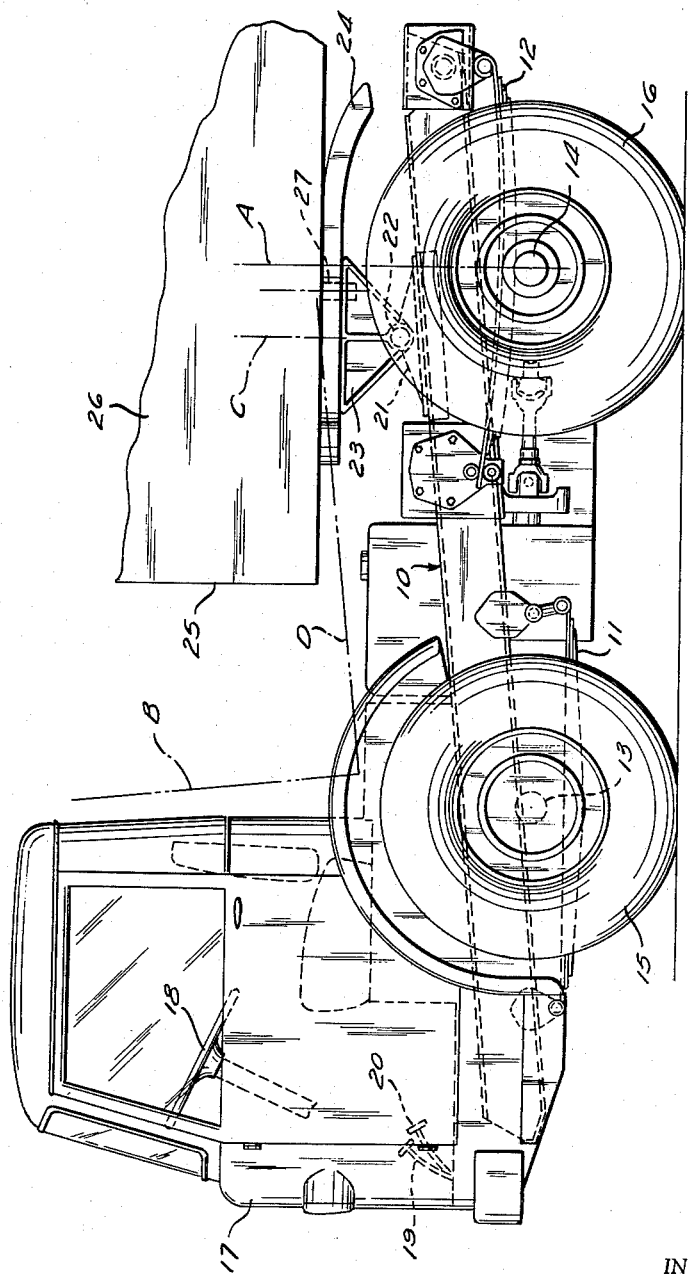
FIG. 1 is a side elevational view of the tractor and a fragmentary portion of the trailer. The maximum actuated position of the corner of the trailer is indicated in dot-dash lines.

Referring first to FIG. 1, the tractor comprises a chassis frame 10, front and rear springs 11 and 12 supported thereby, and axles 13 and 14 that carry the road wheels 15 and 16.

The forward end of the frame has a cab 17 mounted thereon which encloses a steering gear 18, clutch and brake levers 19 and 20, and other instrumentalities of the usual form for the control of the vehicle. The frame supports a transverse bracket 21 having pins 22 in the upper portion thereof for a pair of companion brackets 23 affixed to the fifth wheel plate 24. The pivot pins 22 are disposed forward the vertical center line A of the rear wheels and the top of the fifth wheel is above the top of the frame. The forward end 25 of the trailer 26 is disposed substantially half way between the rearward face of the cab 17 and the vertical center line A of the rear wheels and is mounted for horizontal pivotal movement on a king pin 27 disposed between the center of the pivot pin 22 and the vertical center line A of the rear wheels.

As illustrated in FIG. 2, the road wheels 15 are indicated in the position of their maximum turning radius and an arcuate dot-dash line B struck from the center of the king pin 27 illustrates the path of travel of the forward corner of the trailer 26. Obviously the geometry of the arrangement of the king pin, the fifth wheel pivot, and the length of the tractor may be modified to attain the results accomplished herein provided the king pin is rearward the pivotal center line C and a portion of the weight of the tractor and trailer tare load is borne by both the front and rear wheels of the tractor.

Expressed another way, the load of the trailer is imposed on both the front steering wheels and the rear drive wheels. The vertical center line A locates a plane of balance which includes the axis of the rear wheels. Trailer loads are disposed forwardly of this plane to assure the imposition of a part of the trailer weight on the front steering wheels.

In the past, the usual practice has been to place the equivalent of pivot pin 22 in the plane of balance on the rear wheels to keep all trailer loads disposed on the rear wheels. To maintain all trailer weight so disposed on the rear wheels at all times, the usual practice has been to provide dual rear axles. The plane of balance is disposed midway between the axles and the trailer load is supported totally by the rear wheels in all terrain.

With the present invention, the trailer load is always imposed on the tractor forward of this plane of balance. Since the load is imposed forward of the plane of balance, some weight is kept on the front steering wheels at all times.

The position of the forward end of the trailer is indicated in dot-dash lines D when the tractor negotiates a protrusion or undulation in the road and the trailer rocks upon its pivot pin 22.

It will be seen from the foregoing that the weight of the trailer is forward the vertical center line A of the rear wheels of the tractor, that the king pin 27 is rearward the pivot pin 22 and that the fifth wheel pivot pin 22 is forward the center line A, thus under full torque loads during sharp turns the tractor will remain stable since the load imposed thereon will eliminate vertical elevation of the forward end thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. In a tractor assembly for pulling a highway trailer the combination of, a frame, front axles connected to said frame, front road wheels mounted on said front axles, a single rear axle, rear road wheels mounted on said rear axle for rotation about a single axis disposed in a vertical plane of balance, a fifth wheel pivotally connected to said frame for pivotal movement relative to the frame about an axis disposed in a plane between said front wheels and said plane of balance, and said fifth wheel including means to connect a trailer king pin, said means being disposed between said planes.

2. A tractor trailer combination comprising, a tractor including a frame and front road wheels connected to the frame, said tractor also including a single rear axle connected to the frame and rear road wheels connected to the rear axle, hinge plates on said frame, a fifth wheel, a second hinge plate on the bottom of said fifth wheel, pins connecting said plate for vertical pivotal movement of said fifth wheel, a trailer on said fifth wheel, a king pin in said fifth wheel for the horizontal rotative movement of said trailer, said king pin being disposed rearward of the pivotal connection of the fifth wheel and forward of the vertical centerline of said rear axle.

3. A tractor trailer assembly comprising, a tractor including a frame and front road wheels connected to the frame, said tractor also including a single rear axle connected to the frame and rear road wheels connected to the axle, said wheel being disposed to form a vehicle with a short wheel base, a fifth wheel on said frame, a pivotal connection between the fifth wheel and said frame for vertical movement of said fifth wheel, a trailer on said fifth wheel, a king pin in said fifth wheel rearward said pivotal connection for said fifth wheel and forward a vertical plane through the center of said rear axle.

4. In a tractor assembly for pulling a highway trailer the combination of, a frame, front and rear road wheels secured to and supporting the frame, the foremost of said rear wheels being disposed for rotation about an axis in a first vertical transverse plane, a fifth wheel pivotally connected to said frame for pivotal movement relative to the frame about an axis disposed in a second vertical transverse plane between said front wheels and said first plane, and said fifth wheel including means to connect a trailer king pin, said means being spaced rearwardly from said second plane.

5. The device of claim 4 wherein a cab is carried by the frame forward of said front road wheels.

References Cited in the file of this patent
UNITED STATES PATENTS

| | | |
|---|---|---|
| 2,056,262 | Edwards | Oct. 6, 1936 |
| 2,317,508 | Zoder | Apr. 27, 1943 |
| 2,495,943 | Peterson | Jan. 31, 1950 |
| 2,764,424 | Standing | Sept. 25, 1956 |